United States Patent
Olsen et al.

(10) Patent No.: US 9,532,153 B2
(45) Date of Patent: Dec. 27, 2016

(54) METHOD AND A SYSTEM OF PROVIDING INFORMATION TO A USER

(71) Applicant: Bang & Olufsen A/S, Struer (DK)

(72) Inventors: Martin Olsen, Struer (DK); Martin Bo Møller, Struer (DK); Søren Borup Jensen, Struer (DK)

(73) Assignee: BANG & OLUFSEN A/S, Struer (DK)

( * ) Notice: Subject to any disclaimer, the term of this patent is extended or adjusted under 35 U.S.C. 154(b) by 228 days.

(21) Appl. No.: 14/013,550

(22) Filed: Aug. 29, 2013

(65) Prior Publication Data

US 2014/0064501 A1    Mar. 6, 2014

(30) Foreign Application Priority Data

Aug. 29, 2012    (DK) ................................. 2012 00530

(51) Int. Cl.
*H04R 29/00*    (2006.01)
*H04S 3/00*    (2006.01)
(Continued)

(52) U.S. Cl.
CPC ............... *H04R 29/00* (2013.01); *H04S 7/303* (2013.01); *H04S 7/40* (2013.01); *G10K 2210/111* (2013.01); *G10K 2210/12* (2013.01); *G10K 2210/3044* (2013.01); *H04N 1/0049* (2013.01); *H04R 3/12* (2013.01); *H04R 27/00* (2013.01); *H04R 2499/13* (2013.01); *H04S 1/007* (2013.01);
(Continued)

(58) Field of Classification Search
CPC ......... H04R 5/04; H04R 2499/13; H04R 3/12; H04R 29/00; H04R 27/00; H04S 3/002; H04S 7/301; H04S 2400/09; H04S 3/008; H04S 1/007; H04S 2420/01; H04S 1/00; H04S 7/40; H04S 7/303; H04N 21/4126; H04N 21/44222
USPC .... 381/59, 77–82, 94.1, 73.1, 71.1, 86, 302, 381/85, 304, 97; 181/148, 155, 156
See application file for complete search history.

(56) References Cited

U.S. PATENT DOCUMENTS 5,182,552 A  *  1/1993  Paynting ....................... 340/4.42
5,778,087 A  *  7/1998  Dunlavy ....................... 381/303
(Continued)

FOREIGN PATENT DOCUMENTS

WO    WO-03 026343        3/2003
WO    WO 2009138936 A1 * 11/2009
WO    WO-2012097210 A1    7/2012

OTHER PUBLICATIONS

Bethlehem et al, a constrianed optimization approach for multi-zones surround sound, 2011.*
(Continued)

*Primary Examiner* — Davetta W Goins
*Assistant Examiner* — Kuassi Ganmavo
(74) *Attorney, Agent, or Firm* — Harness, Dickey & Pierce, PLC

(57) ABSTRACT

A method and system for providing information to a user positioned in a room with two independent listening areas where, in one area, an audio signal is output compensating for the sound from the other area, and where a position between the two areas is indicated to a user. When the user moves about, the position and size of one listening area may change, and the user may be made aware of any conflict with the other listening area. The areas may be defined by boundaries where a compensation quality is at a threshold quality.

20 Claims, 2 Drawing Sheets

Figure 1:
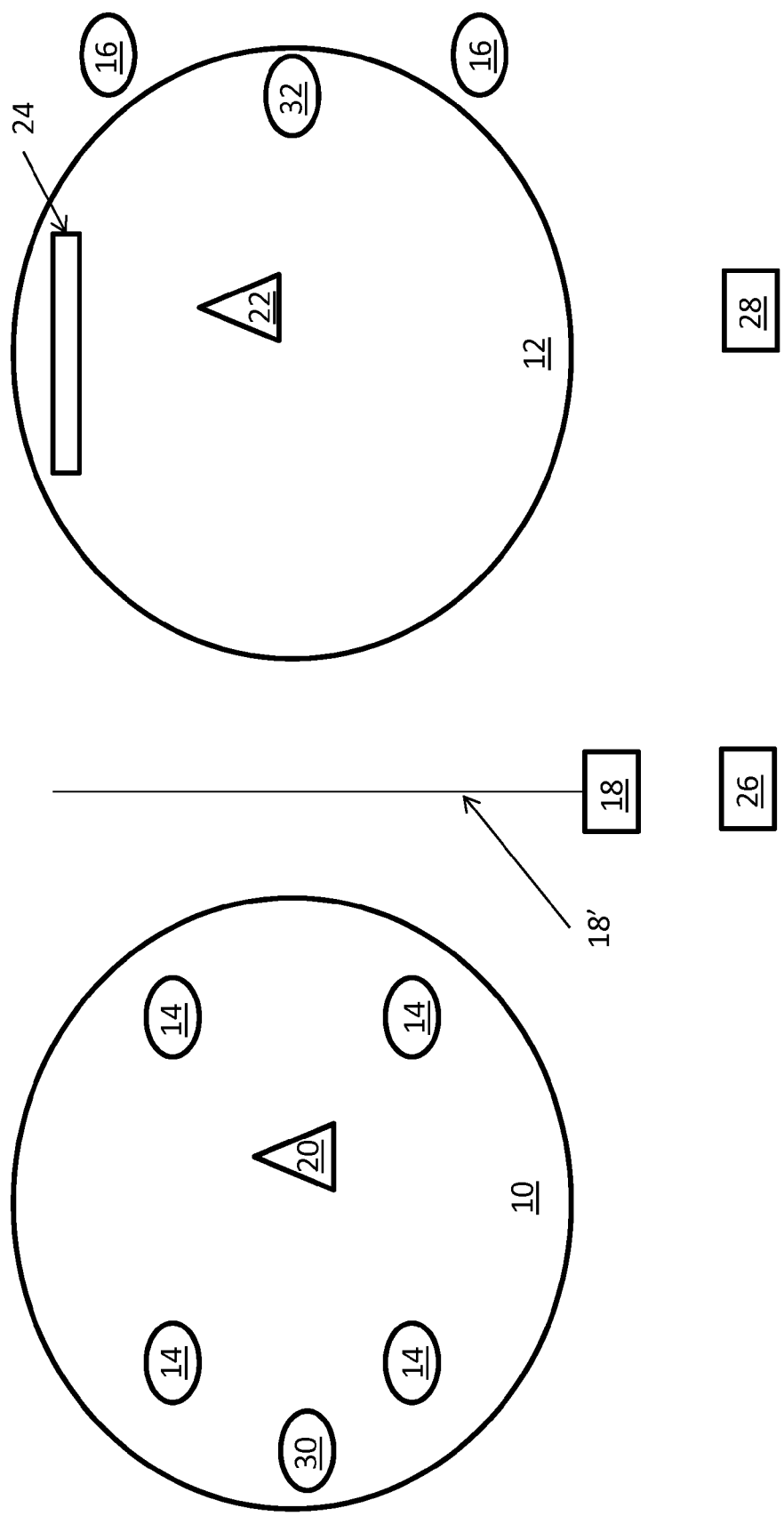

(51) Int. Cl.
  *H04S 7/00* (2006.01)
  *H04S 1/00* (2006.01)
  *H04R 3/12* (2006.01)
  *H04N 1/00* (2006.01)
  *H04R 27/00* (2006.01)

(52) U.S. Cl.
  CPC ............... *H04S 3/008* (2013.01); *H04S 7/301* (2013.01); *H04S 2400/09* (2013.01); *H04S 2420/01* (2013.01)

(56) References Cited

U.S. PATENT DOCUMENTS

| | | | | |
|---|---|---|---|---|
| 6,154,549 | A * | 11/2000 | Arnold et al. | 381/104 |
| 6,728,661 | B1 * | 4/2004 | Cannelli et al. | 702/187 |
| 6,754,353 | B1 * | 6/2004 | Cheng | 381/71.1 |
| 7,187,777 | B1 * | 3/2007 | Saffran | 381/306 |
| 7,813,933 | B2 | 10/2010 | Martin | |
| 8,111,836 | B1 * | 2/2012 | Graber | 381/71.7 |
| 8,218,783 | B2 * | 7/2012 | Katzer et al. | 381/73.1 |
| 8,229,130 | B2 * | 7/2012 | Paradiso et al. | 381/73.1 |
| 8,810,390 | B2 * | 8/2014 | Frederick | 340/539.23 |
| 2005/0163329 | A1 * | 7/2005 | Dickey | 381/77 |
| 2005/0259831 | A1 * | 11/2005 | Hutt et al. | 381/86 |
| 2006/0262935 | A1 * | 11/2006 | Goose et al. | 381/17 |
| 2007/0053532 | A1 * | 3/2007 | Elliott | H04R 3/12 381/302 |
| 2010/0150361 | A1 * | 6/2010 | Kim | H04N 21/8106 381/59 |
| 2010/0278510 | A1 * | 11/2010 | Goossen | 386/230 |
| 2010/0284544 | A1 * | 11/2010 | Kim et al. | 381/56 |
| 2012/0008806 | A1 * | 1/2012 | Hess | H04R 1/023 381/302 |
| 2012/0140945 | A1 * | 6/2012 | Harris | H04R 1/403 381/86 |
| 2012/0287621 | A1 * | 11/2012 | Lee et al. | 362/231 |
| 2012/0288122 | A1 * | 11/2012 | Lydolf | 381/107 |
| 2013/0129103 | A1 * | 5/2013 | Donaldson | 381/71.1 |
| 2013/0170668 | A1 * | 7/2013 | Hess | H03G 3/20 381/107 |

OTHER PUBLICATIONS

Chang et al, A realization of sound focused personal audio system using acoustic contrast control, 2009.*
Poletti et al, An investigation of 2D Multizones surround sound systems, 2008.*
Møller, Martin Bo et al.; AES Convention Paper, "A Hybrid Method Combining Synthesis of a Sound Field and Control of Acoustic Contrast" Apr. 2012, Budapest.
Francombe, J. et al. AES Convention Paper, "Determining the Threshold of Acceptability for an Interfering Audio Programme" Apr. 2012, Budapest.

* cited by examiner

METHOD AND A SYSTEM OF PROVIDING INFORMATION TO A USER

This application claims priority to Danish Appln. No. PA 2012 00530, filed on Aug. 29, 2012, the entire contents of which is incorporated herein by reference.

The present invention relates to sound reproduction systems and more specifically to the reproduction of sound in two or more sound zones within a listening domain and with visualization of the location of a sound zone or a position between sound zones.

In today's media-driven society, there are more ways for users to access audio, with a plethora of products producing sound in the home, car or almost any other environment.

Potential audio programs include a large variety of music, speech, sound effects and combinations of the three. It is also increasingly common for products producing audio to be portable.

This wide range of increasingly portable products which produce audio coupled with the ubiquity of audio in almost all facets of society naturally leads to an increase in situations in which there is some degree of audio-on-audio interference.

Examples of such situations might include audio produced by a laptop computer in a room with a television; a mobile phone conversation whilst a car radio is on, or in the presence of piped music in a shopping centre, or competing workstations in an office environment.

By establishing listening areas where the perceived sound from each audio source is considered as a private sound zone or area per user, is a major step forward for the benefit of the users.

The aim of the invention is to visualize one or more virtual sound zones or areas or to indicate positions there between to e.g. help the user(s) to understand the change in music provided when he/she is moving around in different areas in a domain e.g. in a house.

An important aspect in the establishing a sound zone is to implement methods in audio rendering systems enabled to eliminate the undesired interference among sound zones identified in a listing domain.

Another important aspect related to the sound zone feature is controlling the ratio of the importance of acoustic contrast and the degree of phase control.

Two papers have been published including the aspects as mentioned above, "Determining the Threshold of Acceptability for an Interfering Audio Programme", Audio Engineering Society—Convention Paper, Presented at the 132nd Convention, 2012 Apr. 26-29 Budapest, Hungary, and "A Hybrid Method Combining Synthesis of a Sound Field and Control of Acoustic Contrast", Audio Engineering Society—Convention Paper, Presented at the 132nd Convention, 2012 Apr. 26-29 Budapest, Hungary.

Other references may be: U.S. Pat. No. 7,813,933, which describes a method for creating and controlling virtual sound zones, as well as US2006/0262935, WO 03/026343 and WO2012/097210.

The invention addresses the problem, for example, which one user may have when listening to a target program in one sound zone and another user is listening to another target program in another zone, leaving the questions: Where are the sound zones? Within which boundaries can I move around in my own sound zone? Can a target program follow me from one sound zone to another sound zone?

There is a need for the user so know/see where the virtual sound zones physically are located.

In a first aspect, the invention relates to a method of providing information to a user, the method comprising:
  determining or sensing a second audio signal provided in a second area in a predetermined space also comprising a first area,
  providing, in the first area, a first audio signal generated on the basis of the determined/sensed second audio signal, and
  indicating a position between the first and second areas.

In the present context, a space may be any type of enclosed space or a predetermined area outside, for that matter. A space may be a room, a house, a vehicle, a bus, an airplane, an apartment, a compartment, or the like.

In the present context, an audio signal is a sound or audible signal which typically is output by one or more loudspeakers positioned in or directed toward the area in question. In some set-ups, the room may comprise a number of speakers positioned e.g. at a periphery/wall thereof where the areas are defined in the space defined by the speakers. Thus, a speaker need not be physically directed toward an area in order to provide sound thereto. Wall reflections etc. may also be used if desired.

Usually, an audio signal is generated on the basis of an original signal representing the desired audio, such as a song. The original signal may be processed in a number of manners before feeding to the speakers, such as filtering, amplification and the like, and signals for different speakers may be delayed differently in order to obtain a desired sound experience for the user.

The second audio signal may be determined or sensed. Sensing of the audio signal may be obtained using e.g. a microphone. The signal may be determined by e.g. tapping a feed thereof between a source and the loudspeakers or actually from the loudspeakers themselves. Systems exist which provide different sound to different areas, and in such a situation, a sensing of one audio signal is not required, as the pure signal, such as from the source, is available. This provides a faster and more precise compensation for the signal.

The first and second areas usually will be non-overlapping, as it is difficult to provide different sound signals in the same area—with a sufficient or desired minimum quality of the delivery of the sound. This is described in further detail further below.

The first and second areas may be defined in many ways. A suitable manner of defining an area is an area within which a sound is provided with a sufficient quality. In the present context, a sufficient quality may be that the intensity of sound from other areas is sufficiently low. Thus, the boundary of the area may be the boundary at which the quality is the threshold quality.

The providing of the first audio signal is e.g. the outputting of an audio signal to or toward the first area. Usually, this step will require the feeding of a corresponding signal to such speakers.

The first audio signal—or the corresponding feed signal to loudspeaker(s)—is based on the determined/sensed second audio signal. In that respect, the first audio signal preferably is configured or generated to counter-act or extinguish the second sound signal in the first area. This may be to generate a silent zone in the first area. Alternatively, another sound signal, such as a sound, may be desired provided within the first area.

The method further comprises the step of indicating a position between the first and second areas. This position may be a position directly between the areas. The position may be a line, such as an outline of the first and/or second areas. The position may be at a predetermined position in relation to one of the first and second areas, such as an outline of one of the areas, so as to indicate to a user where the area is or within which boundary a sound signal is provided with a minimum quality.

As will be described further below, the actual position may be highlighted to a person, or the person may be informed, such as by a sound, when approaching or crossing a position or line.

In one embodiment, the step of providing of the first audio signal comprises one or more sound providers providing the first audio signal, and wherein the step of generating the first audio signal comprises accessing a target or original signal, generating a feed signal by adapting the target signal on the basis of the determined/sensed second audio signal and feeding the feed signal to one or more sound generators.

As mentioned above, the target signal may be a song or the like. This may be obtained or accessed from any type of source, such as a local storage, hard drive or DVD drive, a local media server, a remote server, the internet, streamed from a source, such as a radio, wireless or over the internet.

The adaptation may be performed in a number of manners. Some of these manners are described in the above-cited references. Generally, a phase shifted representation of the sensed/determined signal may be added to the target signal to generate the adapted signal. However, further adaptation, such as providing a delay, may be performed. Also, as music typically is rather rhythmical, it may be desired to actually foresee at least part of the second audio signal and incorporate this predicted signal into the adaptation.

In this situation, the indication step may operate to indicate boundaries within which the first and second sound signals may be listened to with a given quality. Also, any changes to e.g. the second sound signal may bring about changes in the first audio signal. This again may bring about a change in the extent of the first area, and this may be indicated in the indicating step, so that e.g. a user bringing about the change in the second sound signal, such as the increasing of a volume of the sound, may see the effect thereof on the first area and e.g. a user of the first area.

Naturally, an alternative exists to the embodiment where the first audio signal comprises both a target signal, such as a song, and a compensation portion. The alternative would be to feed the first signal relating only to the second audio signal, such as a compensation signal, so as to effectively generate a silent zone. In this situation, the user may use the silent zone to provide his/her own sound, such as from a portable device, such as a cell phone/tablet/portable PC—or e.g. a guitar.

In one situation, the step of indicating the position comprises determining a position between the first and second areas where the adapted first audio signal fulfils a predetermined parameter. Preferably, this parameter is a predetermined maximum sound pressure or intensity of the second sound signal or a part thereof, such as within a predetermined frequency interval. Alternatively, a quality parameter as described in the above-cited references, which are hereby incorporated by reference, may be used.

In one situation, the step of indicating the position comprises determining a position between the first and second areas where the second audio signal fulfils a predetermined parameter. Naturally, the same parameters may be used for the second audio signal.

In one embodiment, the method further comprises the step of determining a first position of a user in the second area. This information may be used in a number of manners.

The position may be determined in any of a large number of manners. A person may be identified using a thermal camera, a usual camera using recognition software, movement detectors or the like. Also sounds output by the user may be used to determine his/her position. In addition, a position of a token or element held by the person may be determined, such as by triangulation, which token may output a signal, such as a communication signal. Cell phones, tablets, portable media centres, laptop computers, remote controls and the like usually are configured to communicate via WiFi, GSM, Bluetooth, radio waves, ultrasound, InfraRed, or the like. Also, RFID-tokens, for example, are configured to output a signal which may be detected and the origin determined.

In one situation, the step of indicating the position comprises indicating the position, when the first position, i.e. the user, is within a predetermined distance of the position. Then, the indicating may be performed only when the user is within the predetermined distance of the position. Naturally, this predetermined distance may be any distance, and it may vary from situation to situation. The predetermined distance may be selected on the basis of a sound quality at the position, so that, actually, the indication is performed when the user is at a position with a predetermined sound quality or predetermined minimum sound quality. Alternatively or additionally, the predetermined distance may be a predetermined percentage of a distance between centres or boundaries of the first and second areas. This percentage may be 50%, 40%, 30%, 20%, 10%, 5% or any other percentage.

In that or another situation, the step of indicating the position comprises altering the second audio signal, when the first position is within a predetermined distance of the position. Thus, instead of or in addition to a visual indication of the position, the second audio signal may be altered so that the user may realize that he/she is within a distance of the position, such as a distance from a boundary of the first area. This changing of the second audio signal may be a change in volume, frequency contents or the like. Alternatively, in addition to a desired audio signal, such as a song, an additional audio signal may be added thereto in the second audio signal, which additional audio signal may e.g. be a verbal warning or a recognizable sound, which the user may distinguish from the song and thus be made aware of his/her approaching the predetermined distance or the position.

In yet another situation, the step of providing the second audio signal to the second area and adapting the second audio signal to the determined position of the user. In this situation, the second audio signal may be adapted, so that the sound quality of the second audio signal is optimal or within a predetermined limit, even when the user moves about. In one situation, if the user moves away from a loudspeaker providing the second audio signal, the sound output from this loudspeaker may increase in volume. Also, the position and/or size of the second area may then change. This, naturally, will affect the sound output in the first area, whereby it may also affect any compensation performed in the first area. Below, the situation is described where different users have different priorities or rank, and where a higher-ranking user moves into the area of a lower-ranking user.

In one embodiment, the method further comprises the step of a second sound generator outputting the second audio signal in the second area, where the second sound generator is moved around in the second area, which also for that reason may change in position/size, and wherein the adapting step is performed continuously or intermittently.

In this situation, the second sound generator may be a portable element, such as a cell phone, portable media player, laptop computer, tablet, or the like. Thus, the sound volume determined or sensed at the first area will change, as the second sound generator is moved around and potentially also directed toward/away from the first area. Thus, it is desired that the adapting step is not static but dynamic. Thus, adaptation parameters may be determined as swiftly and as often as possible, or they may be determined at time intervals of e.g. 1 s, 100 ms, 50 ms or less.

Naturally, the step of indicating the position may comprise launching radiation, usually visible light, toward the position. This radiation may be output by a LED, a laser or the like.

A second aspect of the invention relates to a system for providing information to a user, the system comprising:
- one or more first loudspeakers provided in or directed toward a first area of a predetermined space,
- a first processor configured to determine or sense a second audio signal provided in a second area in the space and output, on the basis of the sensed/determined signal, a feed signal to the first loudspeaker(s), and
- an indicator configured to indicate a position between the first and second areas.

In this context, a system may be a single unit or may be an assembly of elements which are configured to communicate with each other via wires and/or wirelessly.

A loudspeaker is an element configured to output sound, such as on the basis of a received signal. A loudspeaker may be passive, whereby it converts a received signal into corresponding sound, where "corresponding" means that the frequency contents, volume etc. of the sound imitates or approximates those of the received signal. Alternatively, the loudspeaker may be active and comprise elements, such as amplifier, filter, delay circuit or the like configured to alter a received signal before outputting a sound corresponding to the altered signal. The alteration may be an amplification, conversion (D/A, for example), filtering (alteration of frequency components) and/or delay. An active loudspeaker thus may receive both power (if not powered by a built-in battery), a feed signal (such as a song) and parameters describing or controlling the adaptation of the received signal before converting adapted signal into corresponding sound.

Usually, the second audio signal is provided in the second area by one or more loudspeakers provided in or directed toward the second area. However, the origin of the second audio signal is not important, and this audio signal may equally well be generated by a person singing or playing instruments, such a trumpet, drums or a guitar.

A processor may be a single element or an assembly of individual elements configured to communicate with each other. A processor may be hardwired and/or software controllable and may comprise an ASIC, a FPGA, a DSP, a chip, a computer, a server or a combination thereof.

The processor is configured to determine or sense the second audio signal. In one situation, the processor may determine the second audio signal by receiving a signal corresponding thereto, such as from a source of an original signal used for generating the second audio signal. The processor thus may comprise an input for receiving this original signal. In fact, the original signal may travel through the processor on its way to the second area.

In that or another situation, the processor may comprise a sensor, such as a microphone, for sensing the second audio signal and forwarding a corresponding signal to the processor.

The feed signal for the first loudspeaker(s) may be a signal configured to be directly converted into sound, such as for use with a passive loudspeaker. Alternatively, the signal may be configured to be amplified by a simple, active loudspeaker comprising an amplifier, or the feed signal comprises parameters or information describing a signal adaptation to be performed in the loudspeaker(s), which parameters describe one or more of: amplification, filtering and delay. As described above, the feed signal may comprise, in addition to compensating information, also information relating to a target or original signal, such as desired audio to be enjoyed or listened to, such as a song, in the first area.

The indicator may be embodied in a number of manners, as described above. In one situation, the indicator is configured to output radiation, typically visible light, toward the position. In another situation, the indicator may be configured to alter the first or second audio signals so as to make a user aware of e.g. his/her approaching or positioning at the position.

As mentioned above, the first and second areas typically will be non-overlapping, even though the boundaries or edges thereof need not be well-defined. An edge or boundary may be defined as where a sound quality or compensation quality has a predetermined value, so that this value exceeds the predetermined value within the area in question.

In one situation, the processor is further configured to receive a target signal and output, as the feed signal, a signal based also on the target signal. This target signal, as described, may represent an audio signal which is desired listened to in the first area. This target signal may be received from any type of source, such as a streamed media source, such as a TV channel, a radio channel, a streaming audio server, available over the air or via cables, such as over the internet. The source may also be local, such as a hard drive, media server, DVD drive or the like. The target signal may represent any type of media, such as only audio, or video and audio, such as a music video. The target signal usually is digital, but this is no requirement.

In this situation, the loudspeakers will now output the first audio signal which represents the target signal but which at the same time is based on the second audio signal. Then, the first audio signal may counter-act or extinguish the second audio signal in the first area.

In a simple embodiment, the determined/sensed second audio signal may simply be subtracted in the feed signal, but more elaborate compensation methods are know.

An alternative to having the loudspeakers output the audio signal representing the target signal is to provide an additional or separate element for outputting this audio signal. In one situation, additional speakers, such as in a portable element, may be provided for outputting this audio signal, where the first loudspeakers are then used for counteracting or extinguishing the second audio signal in the first area.

In that situation, where the system further comprises one or more additional loudspeakers configured to output a first audio signal, the indicator may be configured to indicate a position between the first and second areas where the combination of the first audio signal and a signal output by the additional loudspeakers when fed with the feed signal fulfils a predetermined parameter. In this manner, a user in the first area will be able to verify within which boundaries, for example, the sound quality is acceptable, or where not to move to, if he/she does not wish to experience a reduced sound quality.

In that or another embodiment, the system further comprises one or more second loudspeakers configured to output the second audio signal in the second area, and wherein the indicator is configured to indicate a position between the first and second areas where the combined second audio signal and a signal output by the first loudspeakers when fed with the feed signal fulfils a predetermined parameter.

In one embodiment, the system further comprises a first position determining unit configured to determine a first position of a user in the second area. Above, a number of manners are described of determining a position of a user or an element held by the user. Thus, a position determining unit may comprise a camera, a thermal camera, one or more antennas or sensors configured to receive or at least determine a direction of WiFi-communication, GSM-signals, Bluetooth signals, IR signals, RFID signals or the like. Also, the Microsoft Kinect® system may be used, for example. The skilled person will know how to provide and implement such systems to determine the position of the user and/or the element.

In one situation, the indicator is configured to indicate the position, when the first position is within a predetermined distance of the position, such as only when the first position is within the predetermined distance. Above, different manners of determining or defining the distance are described.

In that or another situation, the system further comprises one or more second loudspeakers positioned in or directed at the second area, wherein the indicator is configured to output a second feed signal to the second loudspeakers, or to separate speakers, to output the second audio signal, and wherein the indicator is configured to alter the second feed signal, when the first position is within a predetermined distance of the position. Thus, the indicator may, instead of or in addition to a visible indication or illustration, alter the second audio signal to in that manner indicate to a user that e.g. a limit is exceeded. This signal may be forwarded to the processor and incorporated in the second audio signal, if the processor generates the signal for the second loudspeakers.

In one embodiment, the system further comprises one or more loudspeakers positioned in or directed at the second area as well as a second processor configured to receive a second input signal and output a corresponding second feed signal to the second loudspeakers, the second processor being configured to adapt the second feed signal to the determined position of the user.

In one embodiment, the first processor is configured to determine/sense the second audio signal and output the feed signal continuously or intermittently. This may be desired when the second audio signal varies, such as in intensity. In that situation, the determination/sensing as well as the compensation is desired dynamic. Also, the indication or indicator may be dynamic and operative to e.g. indicate a position, when this position is changed due to changes in the second audio signal.

In the following, preferred embodiments are described with reference to the drawing, wherein FIG. 1 indicates a room with two listening areas and FIG. 2 indicates a manner of indicating listening areas.

In FIG. 1, a set-up indicating preferred embodiments of the invention is indicated in which two areas, 10, 12, are defined within a house, a room, a car, a vehicle, an airplane, a train, a bus or the like, generally indicated by 5.

In the first area 10, four speakers 14 are provided which output a first audio signal into the first area 10.

In the second area 12, a second sound signal is generated by speakers 16 positioned outside the area 12.

The areas are defined as areas within the first and second audio signals are fed with a sufficient quality, i.e. with a sufficiently low interaction or crosstalk from the other audio signal. Thus, the speakers 14/16 may be provided inside the areas or not. This is not important.

In the area 10, a user 20 is positioned, who listens to the first audio signal.

In the area 12, a user 22 is listening to the second audio signal while watching a TV 24.

Naturally, the space between the areas 10/12 is not a wall or fixed element, and moving from area 10 to the area 12, the sound from one area will fade and the other increase in volume. Thus, in this area, the amount of sound from each area may be so large that the quality of sound from one area is not sufficient. Thus, this intermediate area is not suited for enjoying the first or the second audio signal.

In the area 12, a microphone 32 is provided for sensing sound. This sound will be a mix of the first and second audio signals.

A processor or sound processing unit 26 feeds the speakers 16. The unit 26 is able to access one or more sources of audio signals, such as a local or remote music file server, a radio antenna, the Internet or the like. The unit 26 will receive or access an audio file or signal and feed a corresponding signal to the speakers 16.

The unit 26, however, also receives the output from the microphone 32 and thus is able to compare the signal fed to the speakers 16 or the audio signal to be provided to the user 22 and the signal received from the microphone 32 also sensing the audio signal output by the speakers 14. The unit 26 now is capable of adapting the signal fed to the speakers 16 in order to compensate for the sound output by the speakers 14 so that the listener 22 hears the sound intended, the sound determined by the audio file accessed by the unit 26. The speakers 16 thus will, in effect, output not only the sound intended for the person 22 to hear but also a signal counter-acting the sound from the speakers 14. This type of compensation is known and has been used for generating neighbouring but non-interfering sound zones (see e.g. WO2012/097210, US7813933, US2006/0262935, "A hybrid Method Combining Synthesis of a Sound Field . . . ", Martin Bo Møller et al, Audio Engineering Society, Presented at $132^{nd}$ Convention, 2012, Apr. 26-29, Budapest, and "Determining the Threshold of Acceptability . . . ", Jon Francombe et al, Audio Engineering Society, Presented at $132^{nd}$ Convention, 2012, Apr. 26-29, Budapest).

The processor 26, naturally, may be constructed from a number of elements, such as a separate amplifier, filter and delay circuit for each speaker, an audio signal provider, such as a DVD player, a radio, a network device, a streaming device, or the like, an input, such as with an A/D converter, for receiving the signal from the microphone 32, as well as a processing unit configured to receive the audio signal from the audio signal provider and the microphone signal and either generate the compensated audio signal for the speakers 16 or the parameters required for the individual amplifier/filter/delay for the individual speaker for these to generate the correct signals for the speakers.

The processor or processing unit may be hardwired or software controllable, and may, e.g. be a chip, an ASIC, a DSP, an FPGA or any combination thereof.

The speakers 14/16 may be active or passive and any number of speakers may be provided. The speakers may each comprise an amplifier, a filter, a delay circuit or the like in order for the speaker to be active. Alternatively, the signal adaptation and amplification may be performed in the processor 26.

An indicator 18 is provided which is configured to output a light beam 18' to different positions in the room/vehicle or the like. In this context, a position may be a single spot or a line or curve.

The indicator 18 is controlled by the unit 26 and may be operated continuously, intermittently or when changes happen to the sound output by the speakers 14/16.

In one embodiment, the indicator 18 comprises a radiation emitter, such as an LED or a laser, such as a laser diode. In this manner, the indicator may indicate the position on the ceiling, floor or walls of the room or by irradiating predetermined elements in the room positioned at suitable positions. The indicator may be free standing, fixed to a ceiling or wall or mounted to another element, such as a TV, multimedia device, PC or the like and may be able to irradiate toward any part of the room.

A standard lens arrangement may be applied to obtain the desired dispersion angle (18') and length of the beam light.

Examples of light beams are:
Cone shaped with a ground plane being circular or elliptical; optionally displayed as a 3D figure in the air.
A beam as a two point crossing line; optionally displayed as a 2D figure in the air.

The indicator may possess a unique identification code and position X,Y,Z address. This can be allocated from the system controller (26) via a data link, or the indicator may have means for position detection by itself e.g. via GPS.

In one embodiment, the indicated position is an indication of a position on an "edge" of the second area 12, where the sound quality of the second audio signal, i.e. the compensation for the first audio signal, is of a predetermined minimum quality, such as as determined by the above reference.

Naturally, "quality" of compensation may be determined in a number of manners. Simple manners exist, such as the determination of a sound intensity of the first audio signal in the signal received by the microphone 32 or at the position in question. This may be the sound intensity of all of the audible spectrum or in smaller frequency intervals if desired. Naturally, this sound may be sensed or estimated/calculated, such as when having access to a source of the corresponding original signal.

If the volume of the sound output by the speakers 14 is increased, the compensation performed by the unit 26 and thus the volume of the compensating signal output by the speakers 16 will increase. In that situation, the user 22 may have to be positioned closer to the speakers 16 in order to obtain a sufficient quality of the sound compensation. Then, the area 12 may be taken to be smaller and thus have a lower extent in the direction toward the area 10.

In that situation, the indicator 18 may be used to indicate a position or boundary of the second area 12 where the compensation is still acceptable. This position indication may be used by the person 22 so as to decide whether to move—and in which direction—when the volume increase takes place.

In addition or alternatively, the user 20 may use the position indication to determine whether to lower the volume again, if the position indicated becomes too close to the person 22.

A number of alternatives exist.

Firstly, an area may be "static", i.e. fixed in position, or may be "dynamic", such as when following the movement of a user. Thus, a position determining unit 28 may be used for determining a position of the user 22 in the area 12. This position may be used for adapting the compensation performed by the unit 26 to ensure, if possible, that the compensation is optimized or at least sufficient at or around the present position of the user 22. In this situation, the indicator 18 may be used for indicating to the user 22, that he/she is approaching a boundary beyond which the compensation is not or cannot be performed satisfactorily.

As an alternative to the use of the speakers 14, the user 20 may hold a handheld device, such as a cell phone, a tablet, a laptop computer or the like. In this situation, the user 20 may move about, whereby the sound intensity of the first audio signal from the user 20 sensed by the microphone 32 will vary, whereby the compensation may be varied and the indicator 18 operated to indicate to the user 20 beyond which boundary, for example, the user 22 will be bothered by the sound from the user 20.

In one example, the processor 26 also feeds the speakers 14, whereby the microphone 32 may not be needed, as the processor 26 already knows the first audio signal. In this situation, the compensation may be performed without any "extra" detection of the first audio signal.

In this context, it is noted that it is generally desired to know the positions of the speakers 14/16 in order to be able to calculate the compensation and the boundary or position to be indicated. Also, dimensions and other characteristics of the room 5, such as the positions of furniture and other elements damping the sound may be desired input into the compensation calculation. Alternatively, the microphone 32 may be used to determine such characteristics empirically.

It is noted that the general set-up and compensation may be mirrored and thus performed in the first area 10, or both areas 10/12 may be compensated so that the users 20/22 are able to enjoy their audio signals undisturbed. Thus, a microphone 30 may be used in that respect. Also, the indicated position then may be multiple positions indicating e.g. the two areas 10/12, a closest position there between if non-overlapping or the like.

Also, any number of microphones may be used in order to determine the sound at such positions in order to facilitate a more wide definition of areas within the room 5. Naturally, a microphone may be built into another element, such as the TV, a loudspeaker or a portable element, such as a cell phone, a tablet, a lap top computer, a remote control or the like.

In one situation, the position sensor 28—or an additional position sensor—may be used for tracking the user 20.

A position sensor may determine the position of a user using imaging technology, such as image recognition of a person or the technology seen in the Microsoft Kinect® hardware, a heat sensitive camera identifying hot objects, such as persons, using ultrasonic transducers and/or a triangulation on a signal output by an element held by the user, such as a cell phone performing WiFi, Bluetooth and/or GSM communication, a remote control, an RFID tag or the like.

In many applications, a plurality of speakers will be positioned in a room and will all be used for generating each listening area 10/12. In this situation, listening areas may be defined more freely within the room. If a listening area is defined or re-defined, the indicator 18 may be used for indicating a boundary thereof—at least in areas close to other listening areas already defined, so that the listening area being defined may be adapted to the existing listening areas.

The determined position of a person 20/22 may additionally be used for adapting the sound provided to the user, so that if the user moves toward a boundary of the area 10/12, the compensation may be adapted so that the area 10/12 effectively changes position and/or shape. This new shape may be indicated by the indicator.

In one situation, the indicator 18 is replaced or supplemented by, upon determination that a position is to be indicated, providing sound in the first/second area(s) to the users therein with an announcement or a sound which the user will recognize. Thus, the user may react to this indication and e.g. revert a change that brought about the indication.

Naturally, different users 20/22 may have different rights. Thus, when one user 20, originally present in one area 10 and enjoying a first audio signal, enters another area 12 where another user is enjoying another, second audio signal, and where the first audio signal follows the user, such as by using a position determining unit, the two areas cannot co-exist. In this situation, an order or rank of the users may be defined, such as by an administrator, so that in "collision" situations, the higher-ranking user will maintain listening to his audio signal, and the lower-ranking user will have his audio signal shut down. Also, when a higher-ranking user moves toward the area of a lower-ranking user, the area of the lower-ranking user may be reduced and the quality of sound provided to the lower-ranking user reduced, until the lower-ranking user is provided with the sound of the higher-ranking user.

Figure 2:
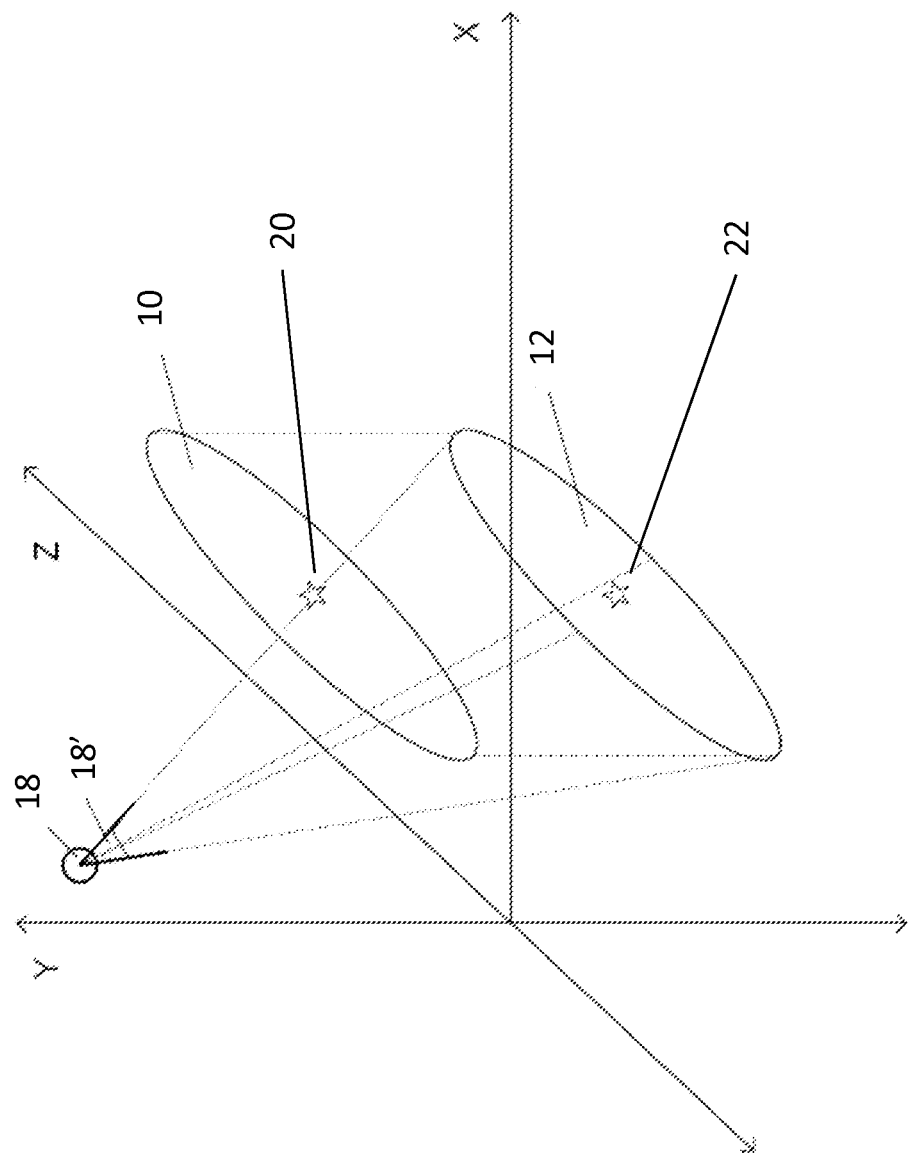

An example may indicate the applicability of the invention, cf. FIG. 2:

A domestic room 5 is represented by a Cartesian coordinate system.
  Furthermore, suppose the transfer functions between all loudspeakers 14/16 and a x,y grid sampling the room 5 are known.
  If the position of a user 20/22 in the room is known, it is possible to control the sound field at x,y,z positions representing a region which encloses the user.
  By knowing the position of the user and transfer functions to the region enclosing the user it is possible to control the sound field around the user e.g. as an optimization of the expected sound energy in the zone 10/12 relative to another zone. Different algorithms for sound field control exist, and not all of them rely on measured transfer functions.

By joining physical visualization means position with physical sound zone position to provide an image of the sound zone is configured:

A domestic space is being represented by a x,y,z coordinate system.
  Suppose the sound zone is circular and positioned around the user. Then, it is possible to represent the zone 10/12 by e.g. a circle at the ceiling. If the user's x,y position is $x_{user}, y_{user}$, the circle should be at $(x,y,z=R\cos(t)+x_{user}, R\sin(t)+y_{user}, z_{ceiling})$, where R is the radius of the circle and t is a parameter running between 0 and 2pi.
  If a projector/indicator is located at $x_{proj}, y_{proj}, z_{proj}$ the location of the illuminated circle from the position of the projector can be described as $(x\ *, y\ *, z\ *) = R\cos(t)+x_{user}-x_{proj}, R\sin(t)+y_{user}-y_{proj}, z_{user}-z_{proj}$.

EMBODIMENTS

1. A system for the reproduction of multichannel sound signals in virtual sound zones and visualization of the same, the system comprising:
    a. A system controller enabled to receiving multichannel sound signals;
    b. A system controller enabled to provide sound signals and control data to one or more sound rendering systems;
    c. The one or more sound rendering systems including one or more active sound transducers, each including control of amplifier—, filtering and delay means and optionally microphone means;
    d. A system controller enabled to configure and control a first sound zone as a first virtual sound zone including fully or partly sound provided by the transducers included in one or more sound rendering systems.
    e. A system controller enabled to configure visualization means to display a first physical representation of the physical location of the first virtual sound zone.
2. A system according to embodiment 1, where a system controller is enabled to configure and control a second sound zone as a second virtual sound zone including fully or partly sound provided by the transducers included in one or more sound rendering systems.
3. A system according to embodiment 1, where a system controller is enabled to configure and control a plurality of sound zones, those sound zones being perceived as different sound areas by listeners.
4. A system according to embodiment 3, where a system controller is enabled to configure visualization means to display a physical representation of the physical location of any of the plurality of virtual sound zone.
5. A system according to embodiment 4, where the one or more virtual sound zones are identified correspondingly as one or more physical sound zones each having a unique addressable position in a X,Y,Z coordinate system.
6. A system according to embodiment 5, where the one or more visualization means are identified correspondingly and each having a unique addressable position in a X,Y,Z coordinate system.
7. A system according to embodiment 6, where visualization means are enabled to issue a visual light signal configured as a linear beam or shaped in a geometrical form, the action caused by a command received by the visualization means and sent from the system controller.
8. A system according to embodiment 7, where visualization means are enabled with rotating means which may direct and orientate the light beam to any addressable point in a X,Y,Z coordinate system.
9. A system according to embodiment 8, where a virtual zone may relate to one of the attributes "static" or "dynamic", where the position of a "static zone" remains fixed as configured by the system controller, and where the position of a "dynamic zone" may change by a reconfiguring made by the system controller.
10. A system according to embodiment 9, where the position of a "dynamic zone" may change from a configured first position related to a first position of a first person in a room to a reconfigured second position related to a second position of a first person in a room.
11. A system according to embodiment 10, where visualization means are enabled to direct and orientate the light beam related to a "static zone" and direct and orientate the light beam related to a "dynamic zone".

The invention claimed is:

1. A method of providing information to a user, the method comprising:

sensing a second audio signal in a first area, the second audio signal being provided in a second area, wherein,
the first and second areas are non-overlapping areas in a space, and
the first and second areas are configured to be provided with separate signals of the second audio signal and a first audio signal, respectively,
providing, in the first area, the first audio signal generated on the basis of the sensed second audio signal, the first audio signal including a compensation signal generated based on the sensed second audio signal, the compensation signal being configured to compensate for crosstalk between the first audio signal and the second audio signal in the first area, and
indicating, to the user, a position that is in the space and between the first and second areas based on the first audio signal and the second audio signal, the position being a position at which crosstalk between the first and second audio signals is equal to or greater than a high crosstalk threshold.

2. The method according to claim 1, wherein the providing of the first audio signal comprises one or more sound providers providing the first audio signal, and wherein the generating the first audio signal comprises accessing a target audio signal, generating a feed signal by adapting the target audio signal on the basis of the determined/sensed second audio signal and feeding the feed signal to one or more sound generators.

3. The method according to claim 1, wherein the indicating the position comprises determining a position between the first and second areas where the first audio signal fulfils a parameter.

4. The method according to claim 1, wherein the indicating the position comprises determining a position between the first and second areas where the second audio signal fulfils a parameter.

5. The method according to claim 1, further comprising determining a first position of a user in the second area.

6. The method according to claim 5, wherein the indicating the position comprises indicating the position, when the first position is within a distance of the position.

7. The method according to claim 5, wherein the indicating the position comprises altering the second audio signal, when the first position is within a distance of the position.

8. The method according to claim 5, further comprising the providing the second audio signal to the second area and adapting the second audio signal to the determined position of the user.

9. The method according to claim 8, further comprising outputting, by a second sound generator, the second audio signal in the second area, where the second sound generator is moved around in the second area, and wherein the adapting is performed continuously or intermittently.

10. The method according to claim 1, wherein the indicating the position comprises launching radiation toward the position.

11. A system for providing information to a user, the system comprising:
one or more first loudspeakers provided in or directed toward a first area of a space,
a first processor configured to sense a second audio signal in the first area, the second audio signal being provided in a second area, wherein
the first and second areas are non-overlapping areas in a space, and
the first and second areas are configured to be provided with separate signals of the second audio signal and a first audio signal, respectively,
output, on the basis of the sensed signal, a feed signal to the one or more first loudspeaker(s), the feed signal including the first audio signal and a compensation signal generated based on the sensed second audio signal, the compensation signal being configured to compensate for crosstalk between the first audio signal and the second audio signal in the first area, and
an indicator configured to indicate, to the user, a position that is in the space and between the first and second areas based on the first audio signal and the second audio signal, the position being a position at which crosstalk between the first and second audio signals is equal to or greater than a high crosstalk threshold.

12. The system according to claim 11, wherein the processor is further configured to receive a target signal, output, as the feed signal, a signal based also on the target signal.

13. The system according to claim 11, further comprising one or more additional loudspeakers configured to output a first audio signal, and wherein the indicator is configured to indicate the position between the first and second areas where the combined first audio signal and a signal output by the additional loudspeakers when fed with the feed signal fulfils a parameter.

14. The system according to claim 11, further comprising one or more additional loudspeakers configured to output the second audio signal in the second area, and wherein the indicator is configured to indicate a position between the first and second areas where the combined second audio signal and a signal output by the additional loudspeakers when fed with the feed signal fulfils a parameter.

15. The system according to claim 11, further comprising a first position determining unit configured to determine a first position of a user in the second area.

16. The system according to claim 15, wherein the indicator is configured to indicate the position, when the first position is within a distance of the position.

17. The system according to claim 15, further comprising one or more second loudspeakers positioned in or directed at the second area, wherein the indicator is configured to output a second feed signal to the second loudspeakers to output the second audio signal, and wherein the indicator is configured to alter the second feed signal, when the first position is within a distance of the position.

18. The system according to claim 15, further comprising one or more second loudspeakers positioned in or directed at the second area as well as a second processor configured to receive a second input signal and output a corresponding second feed signal to the second loudspeakers, the second processor being configured to adapt the second feed signal to the determined position of the user.

19. The system according to claim 11, wherein the first processor is configured to determine/sense the second audio signal and output the feed signal continuously or intermittently.

20. The system according to claim 11, wherein the indicator comprises a radiation emitter configured to launch radiation toward the position.

* * * * *